United States Patent
Yano et al.

(10) Patent No.: US 7,123,599 B2
(45) Date of Patent: Oct. 17, 2006

(54) MOBILE COMMUNICATION SYSTEM

(75) Inventors: Masashi Yano, Yokohama (JP);
Tetsuhiko Hirata, Yokohama (JP);
Masaya Hayashi, Kawasaki (JP);
Hiroaki Nakazawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 10/084,252

(22) Filed: Feb. 28, 2002

(65) Prior Publication Data
US 2003/0012179 A1    Jan. 16, 2003

(30) Foreign Application Priority Data
Jul. 13, 2001    (JP)    ............... 2001-213028

(51) Int. Cl.
H04Q 7/00    (2006.01)
H04L 12/56    (2006.01)

(52) U.S. Cl. .................. 370/331; 370/389; 370/400

(58) Field of Classification Search ............. 370/312, 370/328, 331, 338, 349, 395.21, 395.52, 370/389, 400, 401
See application file for complete search history.

(56) References Cited

U.S. PATENT DOCUMENTS 6,490,259 B1 *  12/2002  Agrawal et al. ........... 370/331
6,804,221 B1 *  10/2004  Magret et al. ............ 370/338
6,862,274 B1 *   3/2005  Tsao et al. ............... 370/338
6,865,184 B1 *   3/2005  Thubert et al. ........... 370/401
6,907,033 B1 *   6/2005  Faccin .................... 370/352
6,947,401 B1 *   9/2005  El-Malki et al. .......... 370/331
2002/0126642 A1* 9/2002  Shitama ................... 370/338

OTHER PUBLICATIONS

IETF Mobile IP Working Group Internet-Draft Mobility Support in IPv6, Nov. 17, 2000, pp. 1-110.

* cited by examiner

*Primary Examiner*—Seema S. Rao
*Assistant Examiner*—Mark A. Mais
(74) *Attorney, Agent, or Firm*—McDermott Will & Emery LLP

(57) ABSTRACT

A mobile data communication system capable of shortening the interruption time of communication includes an HA device, advertising routers, base stations, routers, and mobile terminal devices. Each base station advertises an address having "1" set in a different bit of an interface ID of a routing address. When a mobile terminal has received radio waves from a plurality of base stations in the vicinity of a boundary between cells, the mobile terminal combines a plurality of received routing addresses by logical summation and registers a resultant routing address with the HA device. As for a packet delivered from the HA device to the routing address and having "1" in a plurality of bits of the host section, a router resolves the address of the host section into destination addresses each having "1" in one bit, generates packets each having one of resultant addresses, and transmits the generated packets.

8 Claims, 10 Drawing Sheets

FIG.3
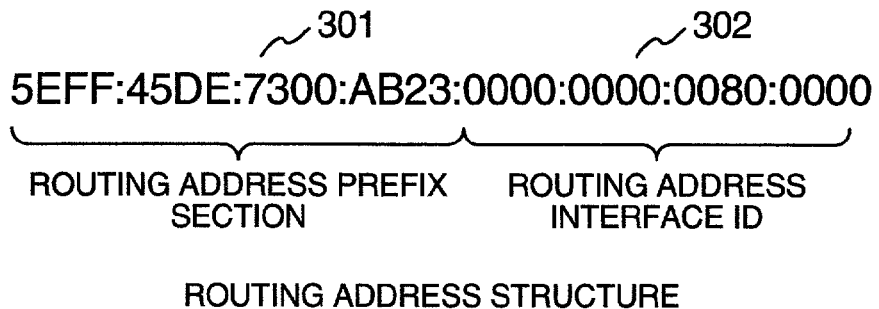
ROUTING ADDRESS STRUCTURE
FIG.4A
BASE STATION (104)
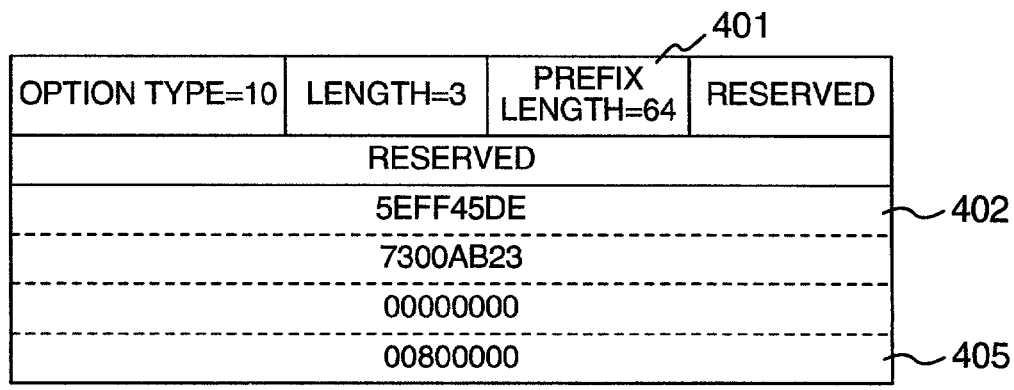
FIG.4B
BASE STATION (112)
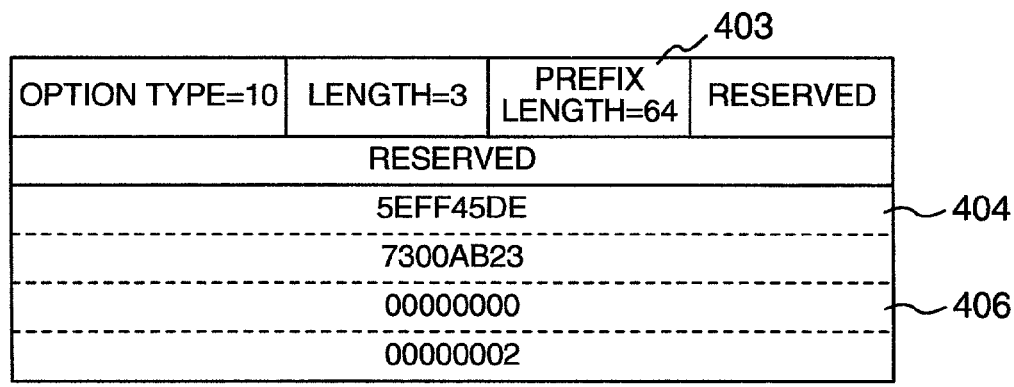
FIG.4C
ROUTING HEADER ADDRESS
5EFF:45DE:7300:AB23:0000:0000:0080:0002

FIG.7

| ADDRESS (901) | PREFIX LENGTH (905) | FIRST I/F (902) | SECOND I/F (903) | THIRD I/F (904) |
|---|---|---|---|---|
| 5EFF:45DE:7300:AB23:0000:0000:0000:0002 | 128 | ADVERTISING ROUTER (103) | | |
| 5EFF:45DE:7300:AB23:0000:0000:0000:0800 | 128 | ADVERTISING ROUTER (113) | | |
| 5EFF:45DE:7300:AB23:0040:0000:0000:0000 | 128 | ADVERTISING ROUTER (115) | | |
| 5EFF:45DE:7300:AB23:0000:0000:0000:0802 | 128 | ADVERTISING ROUTER (103) | ADVERTISING ROUTER (113) | |
| 5EFF:45DE:7300:AB23:0040:0000:0000:0802 | 128 | ADVERTISING ROUTER (103) | ADVERTISING ROUTER (113) | ADVERTISING ROUTER (115) |
| 5EFF:45DE:7300:AB23:0040:0000:0000:0002 | 128 | ADVERTISING ROUTER (103) | ADVERTISING ROUTER (115) | |
| 5EFF:45DE:7300:AB23:0040:0000:0000:0800 | 128 | ADVERTISING ROUTER (113) | ADVERTISING ROUTER (115) | |
| ... | ... | ... | ... | ... |

CONFIGURATION EXAMPLE OF
HA DEVICE AND ROUTER

MOBILE COMMUNICATION SYSTEM

BACKGROUND OF THE INVENTION

The present invention relates to a mobile data communication system, and in particular to a technique for maintaining a connection while a mobile terminal is moving between networks.

As small-sized and light weight mobile terminals, such as notebook computers and PDAs (Personal Digital Assistants), spreads and the Internet spreads explosively, an environment that allows use of a mobile terminal even in a visiting place besides home or an office is established, and mail and Internet access utilizing a mobile terminal is becoming popular.

Furthermore, VoIP (Voice over IP) and ALL IP networks are drawing the attention. In the VoIP, data obtained by digitizing analog sound information are packetized and transmitted over an IP network to implement speech communication. In the ALL IP networks, all data are carried on IP frames to conduct communication in mobile communication networks.

In general, an IP network is formed by mutually connecting a plurality of networks (called subnetworks) differing in network number. Each subnetwork has a unique IP address group assigned thereto. Therefore, each of mobile terminals connected to a subnetwork is provided with an IP address included in the unique IP address group assigned to the subnetwork. As for packets transferred between subnetworks, the packets are forwarded on the basis of network numbers. Whenever the mobile terminal moves to a different subnetwork, therefore, the mobile terminal needs to be assigned a different IP address.

If a mobile terminal using IPv4, which is widely used as a communication protocol of the Internet at the present time, moves between subnetworks, then packets directed to an IP address that has been utilized in a network before movement are delivered to the subnetwork of the network number before the movement. In a subnetwork having a different network number after the movement, therefore, it is impossible to maintain the connection by using the IP address utilized in the subnetwork before the movement as it is.

As a communication protocol of the Internet, IPv6 having an address space expanded to 128 bits is spreading. As for IPv6, a technique called Mobile IPv6 (draft-ietf-mobileip-ipv6-13.txt) has been proposed. In order to solve the problem, Mobile IPv6 makes it possible to keep the connection in succession even if a mobile terminal has moved to a different subnetwork. Standardization thereof is under examination in the Internet Engineering Task Force.

In the subnetworks, a subnetwork to which a mobile terminal usually belongs (called home network) is defined According to IPv6. The mobile terminal is assigned a home address as an address to be used in the home network. In the subnetwork, there is provided a Home Agent device (referred to as HA device) having a function of managing location information of mobile terminals for which the subnetwork has been defined as the home network.

Each subnetwork is assigned a high-order section of IPv6 addresses as a prefix address. At least one router called advertising router is provided in each subnetwork. The advertising router advertises a Router Advertisement including a prefix address of the subnetwork to mobile terminals in the subnetwork via a base station. Thereby, the advertising router notifies mobile terminals of a prefix address of a subnetwork to which each mobile terminal has moved or belongs. Furthermore, also in the case where a mobile terminal in a subnetwork has requested a notice of information of the subnetwork to which the mobile terminal belongs at the present time, the advertising router responds by the Router Advertisement.

In the subnetwork to which each mobile terminal has moved, the mobile terminal obtains the prefix address of the subnetwork in which the mobile terminal is present, from the Router Advertisement. By using the address auto configuration function or DHCP (Dynamic Host Configuration Protocol) of IPv6, each mobile terminal gets an address assigned. As a result, each mobile terminal generates a care-of address to be temporarily used in the subnetwork to which the mobile terminal has moved.

The mobile terminal notifies the HA device of the generated care-of address. Thereafter, the HA device captures an IPv6 packet that has arrived at the home address of each mobile terminal, encapsulates the IPv6 packet, and sends it to the care-of address. The mobile terminal decapsulates the encapsulated packet that has arrived at the care-of address, and receives the IPv6 packet that has arrived at the home address.

In this way, the HA device transfers a packet that has arrived at a home address of a home network of a mobile terminal to a care-of address by using the Mobile IPv6 technique. Thereby, the mobile terminal can continuously receive packets destined to the home address. As a result, the mobile terminal can move while maintaining the connection with the opposite party of communication.

In the case where a mobile terminal has moved to a different subnetwork, the mobile terminal cannot detect the fact that it has moved to the different subnetwork until it receives a prefix address of subnetwork information transmitted from the advertising router in the subnetwork to which the mobile terminal has moved. In addition, until a care-of address is generated and registered in the HA device, packets transmitted to the mobile terminal via the HA device are not sent to a new care-of address.

If movement between subnetworks frequently occurs when data are actually flowing such as in the case where a mobile terminal is moving fast or the case where handoff between base stations frequently occurs in a mobile network, packet loss occurs a lot of times. If packet loss occurs a lot of times, the throughput lowers and the communication quality degradation such as sound intermission in the VoIP.

As a result, a further improved mobile data communication technique is demanded.

SUMMARY OF THE INVENTION

The present invention provides a mobile data communication technique capable of reducing packet losses even in the case where mobile terminals move fast or handoff between base stations occurs.

The present invention makes it possible to provide a system using the technique, and an HA device, advertising routers, base stations, routers, and mobile terminal devices that are included in the system.

An aspect of the present invention will now be described concretely.

A range in which radio waves from a certain base station can be received is a cell. One or more cells form a subnetwork. One or more subnetworks form a mobile network.

A mobile terminal according to an aspect of the present invention includes a reception unit capable of receiving radio waves from a plurality of base stations by using a radio communication technique such as CDMA (Code Division Multiple Access). Thus, the mobile terminal can receive subnetwork information transmitted in each subnetwork by an advertising router through a base station, from a plurality of subnetworks.

If a mobile terminal moves between cells respectively belonging to different subnetworks, prefix addresses contained in a plurality of subnetwork information pieces transmitted from advertising routers via base stations are different. The mobile terminal includes a detection unit, which detects that the mobile terminal is moving between subnetworks on the basis of the difference in prefix address.

If the mobile terminal is located near a base station in the vicinity of a cell center, radio waves coming from the base station are strong and a signal intensity sufficient for data communication is obtained, Therefore, the mobile terminal includes a care-of address generation unit for receiving subnetwork information transmitted from one base station and generating a care-of address to be registered with the HA device on the basis of a prefix address of the subnetwork information.

The HA device includes a transfer unit for receiving as a substitute for the mobile terminal a packet destined to the home address of the mobile terminal, on the home network, and transferring the packet to the care-of address.

Since the reception unit receives a packet destined to the care-of address, the mobile terminal can receive a packet destined to the home address, even in a place where the mobile terminal has moved.

If the mobile terminal moves within a cell and then has reached the vicinity of a boundary between cells included in different subnetworks, it becomes possible to receive also a radio wave of different subnetwork information from a different advertising router via a base station that forms the cell. Thus, it becomes possible to receive a plurality of subnetwork information pieces.

Subnetwork information flown through a base station differs from subnetwork to subnetwork, or from base station to base station.

In addition, the subnetwork information includes routing address information, which is an address required to transfer a packet as far as each subnetwork, besides the prefix address required to generate a care-of address.

Parts of routing address information pieces of adjacent base stations or subnetworks are set in accordance with a predetermined rule.

The mobile terminal includes a processing unit. If a plurality of different subnetwork information pieces are received in the vicinity of a boundary between a plurality of cells respectively belonging to different subnetworks, the processing unit combines a plurality of information pieces into one information piece that can be resolved and recognized later, in accordance with a predetermined rule, and conducts location registration of the synthesized information together with a care-of address in the HA device.

To be more concrete, bits of a predetermined section of the routing address are previously assigned to respectively different subnetworks. A base station or a subnetwork sets the assigned bit of the predetermined section to "1", sets other bits to "0", and conducts transmission.

Routing addresses of some subnetworks are provided with a common prefix address. A router in a mobile communication network can recognize one address group to which these routing addresses belong, by this common prefix address.

The mobile terminal includes a processing unit. If a plurality of subnetwork information pieces are received from a plurality of base stations and prefix addresses of those routing addresses are the same and the predetermined sections have "1" in different bits, then the processing unit generates a routing header address by calculating a logical sum (OR) of routing addresses, and registers the routing header address together with a care-of address in the HA device.

In one of expanded headers of IPv6, there is a section called routing header. The routing header includes a list of addresses through which a packet passes on a path ranging from a transmission source to the end. The transmission source sets a first address of the list in the destination address of an IPv6 packet, and transmits the IPv6 packet. If the packet arrives at the first address of the list, the node sets the next address of the list in the destination address, and transfers the packet to the next relay point. By the processing conducted by nodes of the relay points, the packet arrives at the final address of the list.

The HA device includes a transfer processing unit. If a routing header address is registered in the HA device together with the care-of address, then the transfer processing unit sets the routing header of IPv6 so as to deliver the packet to the home address via the registered routing header address and the care-of address, and conducts packet transfer.

A router in the mobile communication network includes a transfer processing unit. If an address set in a destination address section of a packet transferred from the HA device to the router is one of the address group to which the routing address belongs, and the predetermined section has "1" only in one specific bit, the transfer processing unit conducts ordinary routing.

If the address set in the destination address is one of the address group to which the routing address belongs, and the predetermined section has "1" in a plurality of bits, the transfer processing unit resolves the packet so as to have "1" in one bit of the predetermined section, and determines whether routing from a different interface of the router is necessary for each of resultant packets. If necessary, the transfer processing unit resolves the routing address, copies the remaining section, and conducts routing from respective interfaces.

In the case where handoff occurs because of, for example, movement to another subnetwork, therefore, it becomes possible to previously conduct routing of a packet destined to the mobile terminal as far as a base station of another subnetwork considered to become the movement destination, before occurrence of handoff, in addition to the base station now under communication. Accordingly, it becomes possible to receive packets destined to the mobile terminal in succession immediately after the execution of handoff. Thus, even at the time of handoff, packet loss can be reduced.

Furthermore, as another aspect, an advertising router in each subnetwork of a mobile communication network may transmit subnetwork information inclusive of second or more subnetwork address information pieces (referred to as assistant subnetwork information) besides first subnetwork information (referred to as main subnetwork information) for transferring a packet in the subnetwork.

If in this case the mobile terminal is receiving a radio wave, the mobile terminal generates a care-of address on the basis of the main subnetwork information. If radio waves from a plurality of base stations are received and prefix sections of a plurality of received assistant subnetwork information pieces are the same, then the mobile terminal generates a care-of address on the basis of the prefix section, and registers the care-of address with the HA device.

Routing information should be set in the routing table of the router in the mobile communication network so as to conduct multicast routing of a packet having a prefix section of the assistant subnetwork information as far as each base station transmitting the assistant subnetwork information.

According to this aspect as well, the same effects are obtained.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram showing an example of a routing address using an embodiment of the present invention;

FIGS. 4A to 4C are diagrams showing an example of generation of a routing header address using an embodiment of the present invention;

FIG. 7 is a diagram showing a configuration example of a multicast routing table in a router;

DESCRIPTION OF THE EMBODIMENTS

Figure 1:
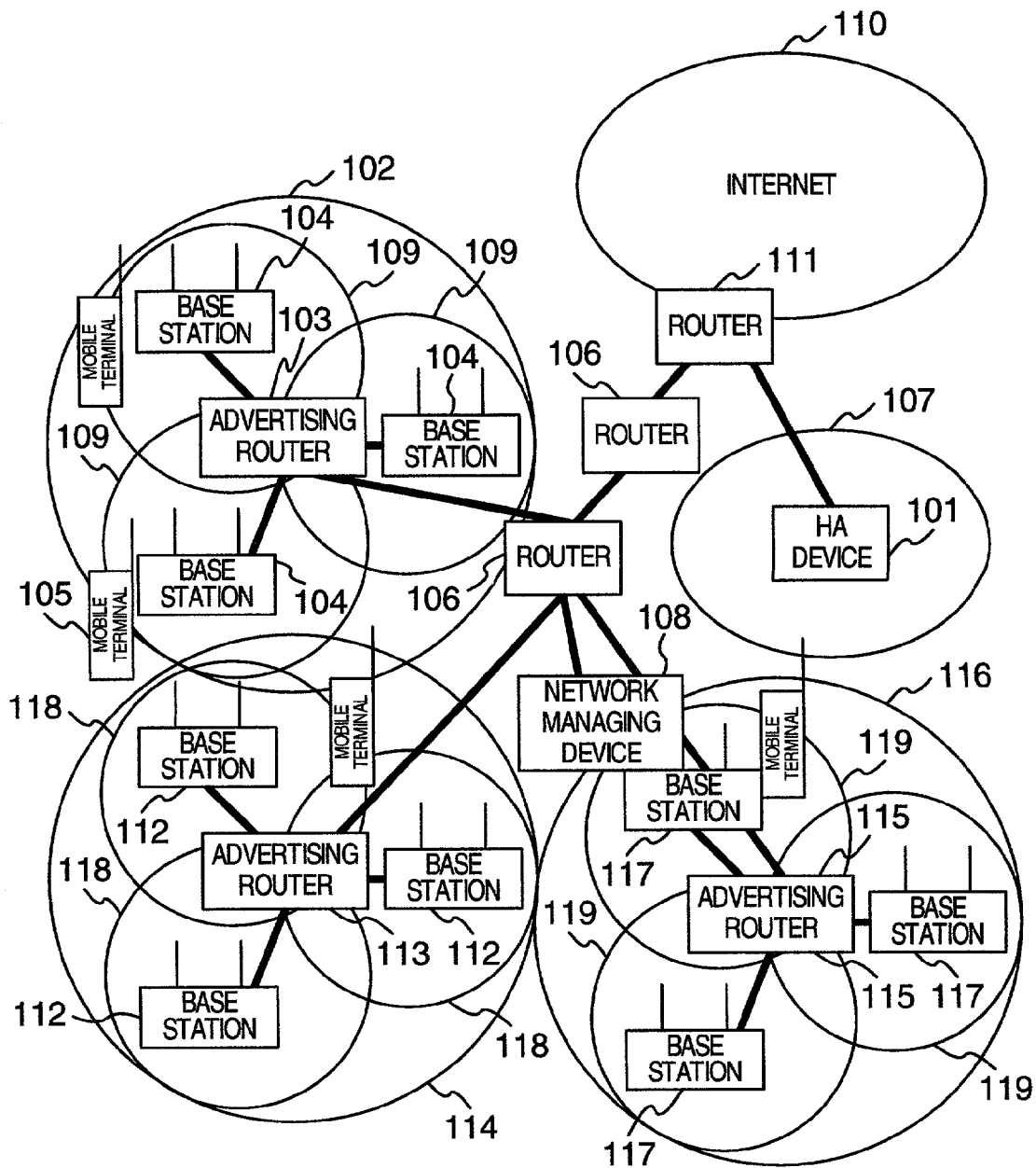
FIG. 1 is a configuration diagram of a mobile communication network using an embodiment of the present invention.

FIG. 1 is a configuration diagram of a mobile data communication system according to an embodiment of the present invention.

In FIG. 1, an HA device 101 accepts location registration requests from mobile terminals 105 in order to conduct location management of the mobile terminals 105, and conducts the location management of the mobile terminals. The HA device 101 includes a processing section. If a mobile terminal 105 exists in a subnetwork 102, 114 or 116 different from its home network 107, the processing section captures IP packets addressed to the mobile terminal 105, encapsulates those IP packets, and transfers them to a registered care-of address. Numeral 108 denotes a network management device. In response to operation of a manager, the network management device conducts conducts management of maintenance and operation of routers and base station included in the mobile data communication system, and conducts connection setting to a router.

Numerals 106 and 111 denote routers, which conduct transfer of IP packets.

Numerals 103, 113 and 115 denote advertising routers. The advertising routers 103, 113 and 115 are respectively disposed in subnetworks 102, 114 and 116 of a mobile communication network. The advertising routers 103, 113 and 115 advertise mobile terminals 105 which have moved to the subnetworks 102, 114 and 116, respectively, of information of subnetworks in which the terminals are located, via respective base stations 104, 112 and 117. The base stations 104, 112 and 117 conduct communication with terminals 105 respectively in cells 109, 118 and 119 by using radio waves. Each subnetwork may include a plurality of cells. The routers 106 may serves as advertising routers as well, or advertising routers may be installed in the base stations.

Each terminal 105 has a processing section, which receives subnetwork information contained in a Router Advertisement message of an advertising router via a base station 104, generates a care-of address and a routing address, and registers the care-of address and the routing address in the HA device 101.

Numeral 110 denotes an IP network such as the Internet connected to the mobile network.

Figure 2:
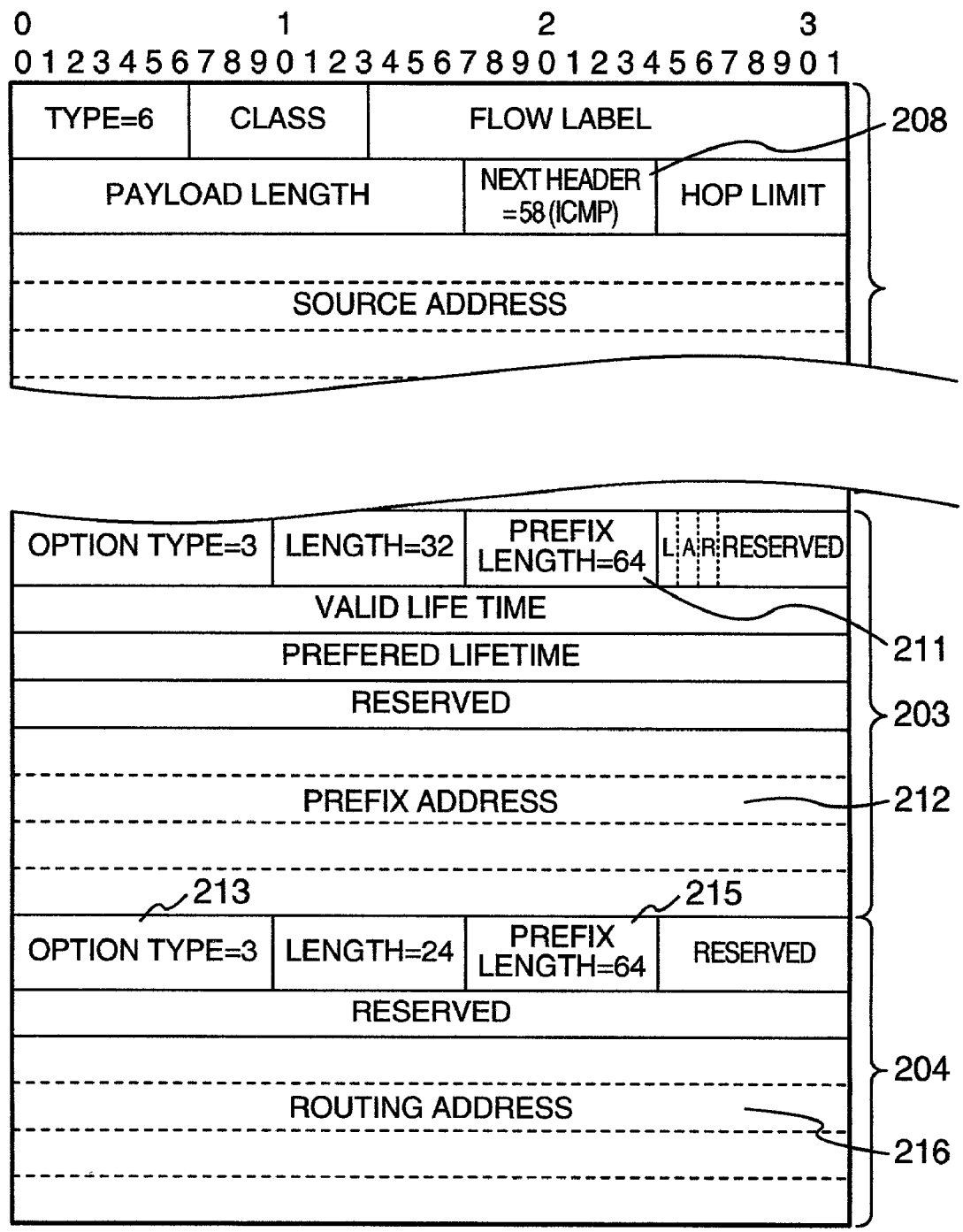
FIG. 2 is a diagram showing an example of a packet format for a Router Advertisement of subnetwork information.

FIG. 2 shows a configuration example of subnetwork information transmitted by an advertising router 103. The subnetwork information is transmitted by utilizing a Router Advertisement message, which is a kind of an ICMPv6 packet described in a technical document RFC 2461 made public from IFTF.

In the present embodiment, the Router Advertisement message defined in RFC 2461 is expanded to notify a terminal of a routing address.

Numeral 208 denotes a type of an ICMP message. In the case of a Router Advertisement message, the type becomes 134. Numeral 203 denotes a section that stores information concerning a prefix address contained in subnetwork information in a Router Advertisement message. Numeral 211 denotes a length of high-order bits that indicates a prefix section of a prefix address 212. Numeral 204 denotes a section extended from the Router Advertisement message by the present embodiment. Information concerning the routing address is stored in the section 204.

A section 213 indicates that an option section of the routing address information section 204 is routing address information. Numeral 216 denotes a region in which a routing address is stored. Numeral 215 denotes a length of high-order bits that indicates a prefix section of the routing address 216. One ICMP message may include a plurality of routing addresses 216.

Each mobile terminal 105 stores its home address in the home network 107. By watching the prefix address 212 in the Router Advertisement message, the mobile terminal 105 finds a prefix address of a subnetwork to which the mobile terminal belongs at the present time, and determines whether it belongs to the home network or it belongs to a subnetwork to which the mobile terminal has moved. Or by comparing the prefix address with a care-of address, the mobile terminal can determine whether it has moved to a different subnetwork.

As for a routing address 216 transmitted from an advertising router 103 to the mobile terminal 105 via a base station 104, an address having "1" in only one bit among 64 low-order bits is set. A routing address transmitted from a base station (for example, a base station 112) included in a cell that belongs to a different subnetwork has "1" set in a different bit.

FIG. 3 shows a configuration example of the routing address 216.

Numeral 301 denotes the prefix section of the routing address, and numeral 302 denotes an interface ID. At the time of transmission from a base station 104, the interface ID 302 has "1" in a previously assigned bit and "0" in other bits. The advertising router 113 belonging to another subnetwork 114 adjacent to the subnetwork 102 transmits a routing address having an equal prefix section 301 and having "1" in a different bit of the interface ID 302 via the base station 112.

An example of routing address generation in the case where a mobile terminal 105 has received a plurality of subnetwork information pieces will now be described.

If the terminal 105 has moved from the home network to the subnetwork 102 in the mobile communication network and receives an ICMP Router Advertisement message containing subnetwork information from the advertising router 103, then the mobile terminal 105 refers to the prefix address 212 contained in the subnetwork information.

On the basis of a difference between the prefix address 212 of the subnetwork in which the mobile terminal 105 is present and the prefix address of the home network held by itself, the mobile terminal 105 detects the fact that it has moved to a subnetwork.

If the mobile terminal 105 is receiving the ICMP Router Advertisement message of one kind, the mobile terminal 105 generates a care-of address of Mobile IPv6 shown in Mobile IPv6 (draft-ietf-mobileip-ipv6-13.txt) by using the auto configuration function, DHCP, or the like of IPv6 shown in RFC 2462, and registers the care-of address in the HA device 101 by utilizing a Binding Update packet of Mobile IPv6.

The routing address information 216 of the routing address information section 204 includes the high-order prefix section 301 masked by the prefix length 215 and the low-order interface ID 302 obtained by excepting the prefix section. If the prefix length 215 is 64, then the interface ID becomes in length 128−64=64 bits and has 1 in one of the 64 bits as described above.

If the mobile terminal 105 has received a plurality of ICMP Router Advertisement messages differing in prefix information 203 from a plurality of subnetworks 102 and 114 via a plurality of base stations 104 and 112, then the mobile terminal 105 selects one from the prefix information used until then and the received prefix information pieces. And the mobile terminal generates a care-of address from the selected prefix information in the same way, and registers the care-of address in the HA device 101.

If a plurality of received ICMP Router Advertisement messages include a plurality of routing addresses 216 that are the same in the prefix section 301 and different in the interface ID 302, then the mobile terminal 105 makes a selection on the routing addresses. In addition, a logical sum of the selected routing addresses is calculated. A routing header address having "1" in a plurality of bits of the interface ID 302 is generated, and registered in the HA device 101.

The function of the mobile terminal 105 in each embodiment may be implemented by execution of a program stored in a memory in the mobile terminal 105 conducted by a CPU, hardware in the mobile terminal 105, or utilization of hardware conducted by a program executed by a CPU.

Generation of the routing header address will now be described in detail by referring to FIG. 4.

FIGS. 4A and 4B show the routing address information section 204 of FIG. 2. FIGS. 4A and 4B show examples of the routing address information pieces 204 of the ICMP Router Advertisement message that the mobile terminal 105 has received from the base station 104 and the base station 112, respectively.

A prefix length 401 of the routing header information section received from the advertising router 103 in the subnetwork 102 via the base station 104 is 64 bits. Therefore, a prefix section 402 of the routing address becomes 5EFF:45DE:7300:AB23. In the same way, a prefix length 403 of the routing address information received from the advertising router 113 in the subnetwork 114 via the base station 112 is 64 bits. Therefore, a prefix section 404 becomes 5EFF:45DE:7300:AB23. Accordingly, the prefix section 402 is equal to the prefix section 404.

In addition, an interface ID 405 of the routing address received from the advertising router 103 in the subnetwork 102 via the base station 104 is 0:80:0:0. An interface ID 406 of the routing address received from the advertising router 113 in the subnetwork 114 via the base station 112 is 0:0:0.2.

Accordingly, the mobile terminal 105 calculates a logical sum of the routing addresses received from the advertising router 103 in the subnetwork 102 and the advertising router 113 in the subnetwork 114. As shown in FIG. 4C, the mobile terminal 105 thus obtains a synthesized routing header address 5EFF:45DE:7300:AB23:0000:0000:0080:0002 and registers the routing header address in the HA device 101.

The present embodiment expands a Binding Update packet used when the mobile terminal 105 has moved from the home network 107 as shown in Mobile IPv6 (draft-ietf-mobileip-ipv6-13.txt) and conducts location registration from the subnetwork 102 to which the mobile terminal 105 has moved, in the HA device 101.

Figures 5, 6:
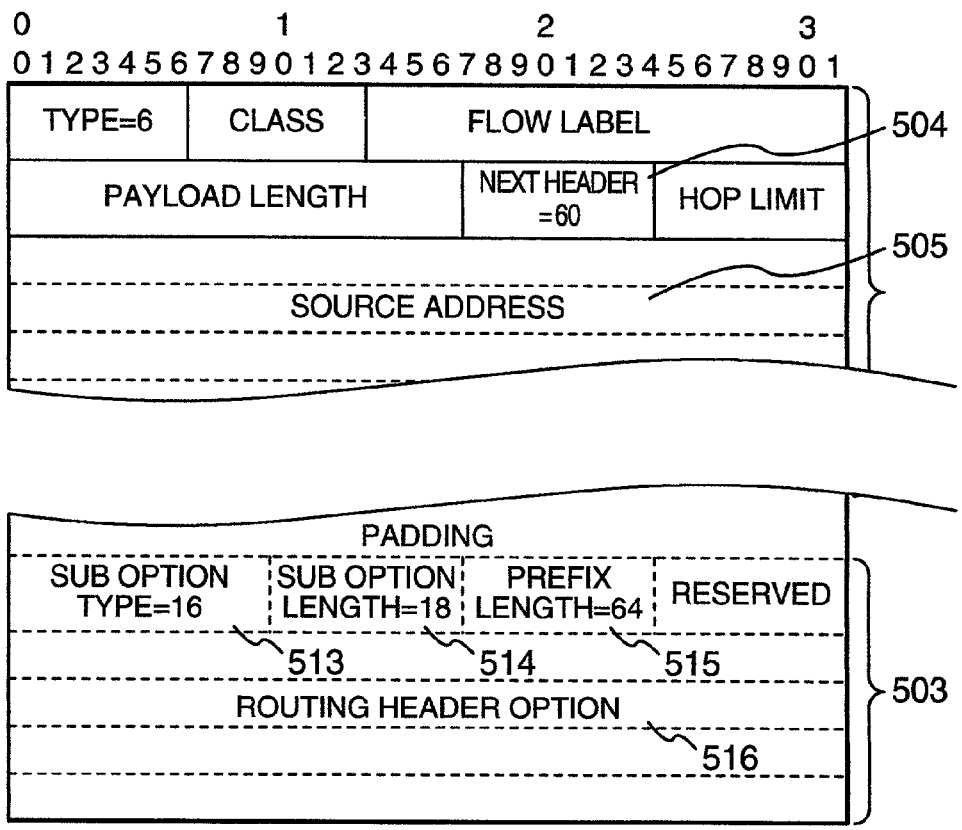
FIG. 5 is a diagram showing a configuration example of a location registration packet.
FIG. 6 is a diagram showing a configuration example of a location management table in an HA device.

FIG. 5 shows an example of an expanded format.

As stipulated in Mobile IPv6, the home address of the mobile terminal 105 that has transmitted a Binding Update packet is stored in a home address option section of the Binding Update packet. A care-of address temporarily used by the mobile terminal 105 in the subnetwork 102 to which it has moved is set in a transmission source IPv6 address.

Numeral 503 denotes a sub-option contained in an option of the Binding Update packet. The sub-option 503 is a section expanded by the present embodiment in order to store the routing header address.

A section 513 indicates that the sub-option has the routing header address stored therein. A section 514 indicates a length of the sub-option. A section 515 indicates a prefix length of a routing header address shown in a section 516. A section 516 indicates an address added to the routing header when the HA device 101 captures and transfers packets addressed to the home address of the mobile terminal 105.

By using the Binding Update packet shown in FIG. 5, the mobile terminal 105 registers the routing header address 516 in the HA device 101 besides the care-of address set in the transmission source IPv6 address of the Binding Update packet.

Figure 13:
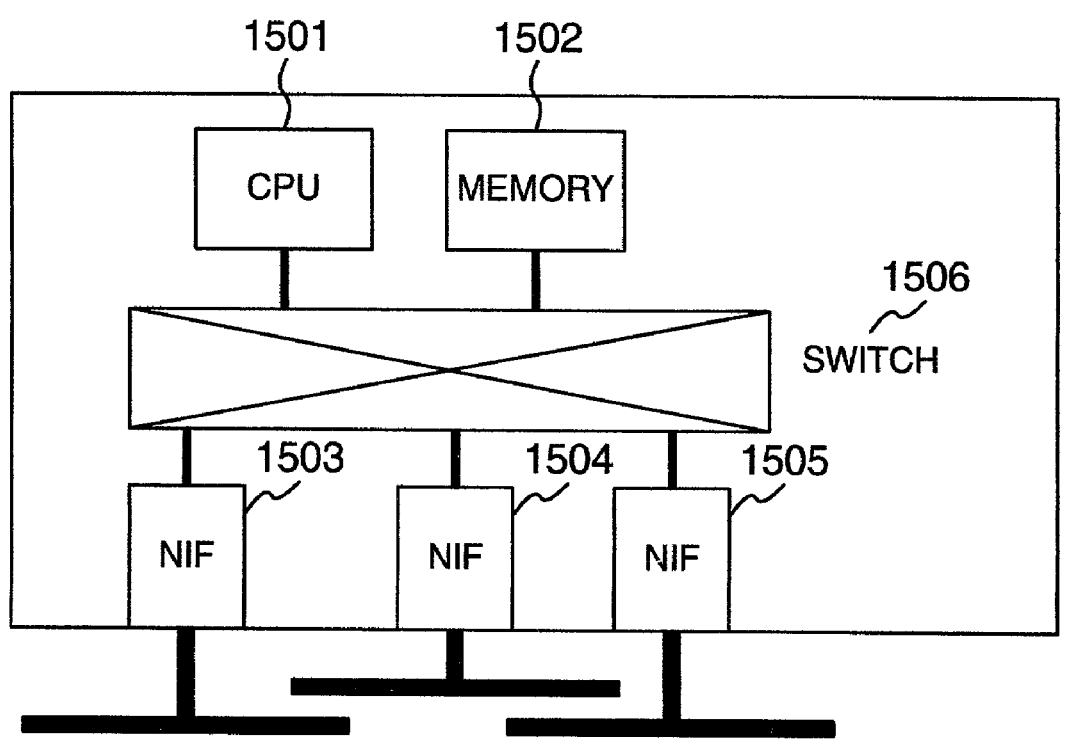
FIG. 13 is a diagram showing a configuration example of an HA device and a router.

FIG. 13 shows a hardware configuration example of the HA device or the router. Numeral 1501 denotes a CPU. Numeral 1502 denotes a memory. Numerals 1503, 1504 and 1505 denote network interfaces. Numeral 1506 denotes a switch.

The CPU 1501, the memory 1502 and the network interfaces 1503 to 1505 are connected to each other through the switch 1506. When operating as the HA device, the CPU 1501 operates according to a program for the HA device stored in the memory 1502. By receiving the Binding Update packet from the mobile terminal 105, in the network interfaces 1503 to 1505, the CPU 1501 conducts location management of the mobile terminal 105.

The memory 1502 has a table (described later by referring to FIG. 6) for managing the location information of mobile terminals stored therein. On the basis of the care-of address used in the transmission source IPv6 address, the routing header address 516, and the home address stored in the home address option, which are contained in the Binding Update packet supplied from the mobile terminal 105, the table is created and updated.

In the case where the mobile terminal 105 is moving, an entry to the table of FIG. 6 is created. In the case where a packet addressed to the mobile terminal 105 has been captured, for example, the CPU 1501 in the HA device 101 conducts processing of encapsulating the captured packet and transferring the encapsulated packet via the network interfaces 1503 to 1505 on the basis of location information of each mobile terminal registered as shown in FIG. 6.

FIG. 6 shows a configuration example of a location management table of mobile terminals 105 the HA device 101 has.

In FIG. 6, numeral 601 denotes a home address of the mobile terminal 105 in the home network 107. Numeral 602 denotes a care-of address temporarily used by the mobile terminal 105 in the subnetwork 102 or 114 to which the mobile terminal 105 has moved. Numeral 603 denotes a routing header address generated on the basis of the routing addresses 402, 405, 404 and 406 contained in the subnetwork information received by the mobile terminal 105 in the subnetwork to which it has moved.

Numeral 604 denotes a lifetime of the location management information of the mobile terminal 105 held by the HA device 101. Before the lifetime expires, the Binding Update packet is not sent from the terminal 105. If the entry is not updated, the lifetime is erased.

When the Binding Update packet shown in FIG. 5 is sent from the mobile terminal 105 to the HA device 101, the HA device 101 takes out the home address of the mobile terminal 105 from the home address option of the Binding Update packet, and uses the home address for entry of the home address 601. If a routing header address 516 exists, the HA device 101 takes out it and uses it for entry of the routing header address 603, and manages the location information of the mobile terminal 105.

The HA device 101 captures packets addressed to the home address 601 of the mobile terminal 105 registered in the location management table shown in FIG. 6 by using a technique such as proxy neighbor discovery when the HA device 101 is connected to a LAN. The HA device 101 encapsulates the captured packets and sends the packets to the care-of address to the subnetwork in which the mobile terminal 105 is present. If a routing header address to the mobile terminal 105 is also registered in the HA device 101, the HA device 101 first sets the routing header address as a destination address, and conducts setting so that the packets will be transferred further to a care-of address in a place where the packets are received by utilizing the routing header function of IPv6 packets.

Operation of routers in the mobile communication network will now be described.

It is now supposed that the advertising router 103 is transmitting, for example, 2001:4555:7300:AB23:0000:0000:0000:0000 as the prefix address 212 of the subnetwork 102, 5EFF:45DE:7300:AB23:0000:0000:0080:0000 as the routing address 216, and 64 as the prefix length 215 of the routing address, into the cell 109 via the base station 104.

It is now supposed that the advertising router 113 is transmitting, for example, 2001:0000:3333:ABCD:0000:0000:0000:0000 as the prefix address 212 of the subnetwork 114, 5EFF:45DE:7300:AB23:0000:0000:0000:0002 as the routing address 216, and 64 as the prefix length 215 of the routing address, into the cell 118 via the base station 112.

It is now supposed that the advertising router 115 is transmitting, for example, 2001:0000:3333:5555:0000:0000:0000:0000 as the prefix address 212 of the subnetwork 116, 5EFF:45DE:7300:AB23:0040:0000:0000:0000 as the routing address 216, and 64 as the prefix length 215 of the routing address, into the cell 119 via the base station 117.

If the mobile terminal 105 can receive subnetwork information from both substations 104 and 112 in the vicinity of a boundary between the cell 109 formed by the base station 104, which belongs to the subnetwork 102, and the cell 118 formed by the base station 112, which belongs to the subnetwork 114, it is supposed that the mobile terminal 105 receives two routing addresses: the routing address 402 and 405 from the subnetwork 102 and the routing address 404 and 406 from the subnetwork 114. If both routing addresses are masked with the prefix length 64 of the routing addresses, the prefix sections 402 and 404 of them are the same. Therefore, the mobile terminal 105 calculates a logical sum of them, generates 5EFF:45DE:7300:AB23:0000:0000:0080:0002 as a routing address, and registers the routing header address in the HA device 101.

If a router is formed by using a hardware configuration diagram shown in FIG. 13, a CPU 1501 is activated by a program for router stored in a memory 1502. Packets received from network interfaces 1503 to 1505 are stored temporarily in the memory 1502. By searching a routing table and a multicast routing table stored in the memory 1502 on the basis of a destination address of the packets, the CPU 1502 determines a network interface to which the received packets are to be output and sends out the received packets from the network interface. Furthermore, the CPU 1502 also executes copy processing of packets required for other multicast routing.

The routing table stored in the memory 1502 of the router in the Internet 110 is set so as to transfer packets having the same prefix as the prefix section of the routing address as far as the router 111, which serves as a gateway to the mobile network.

If the prefix of the destination address of the packets received from the HA device 101 coincides with the prefix section of the routing address and the interface ID has 1 in a plurality of bits, then the router 106 generates and transmits packets each having a destination address that has "1" in one bit of the interface ID.

Or as for a packet that coincides in the prefix section determined by the destination address 901 and the prefix length 905 of the destination address, on the basis of the multicast routing table as shown in FIG. 7, the router 106 may copy the packet and transmit the packet to destinations indicated in columns of interfaces 902, 903 and 904. At that time, the router 106 may copy the IP address of the destination as it is. Or the router 106 may set an address having "1" in only a bit of the interface ID indicating a subnetwork that becomes the destination of transfer from each interface, as a destination IP address.

If a packet with routing header is encapsulated and transferred from the HA device 101 to the mobile terminal 105 has, for example, the same prefix section as that determined by the destination address 901 and the prefix length 905 of the destination address shown in FIG. 7, then each of the advertising routers 103, 113 and 115 conducts processing of a routing header contained in the packet, alters the destination address to a care-of address, and transmits a resultant packet toward respective base stations. Each base station sends the packet to the mobile terminal 105 that exists in a cell formed by the base station.

Figure 8:
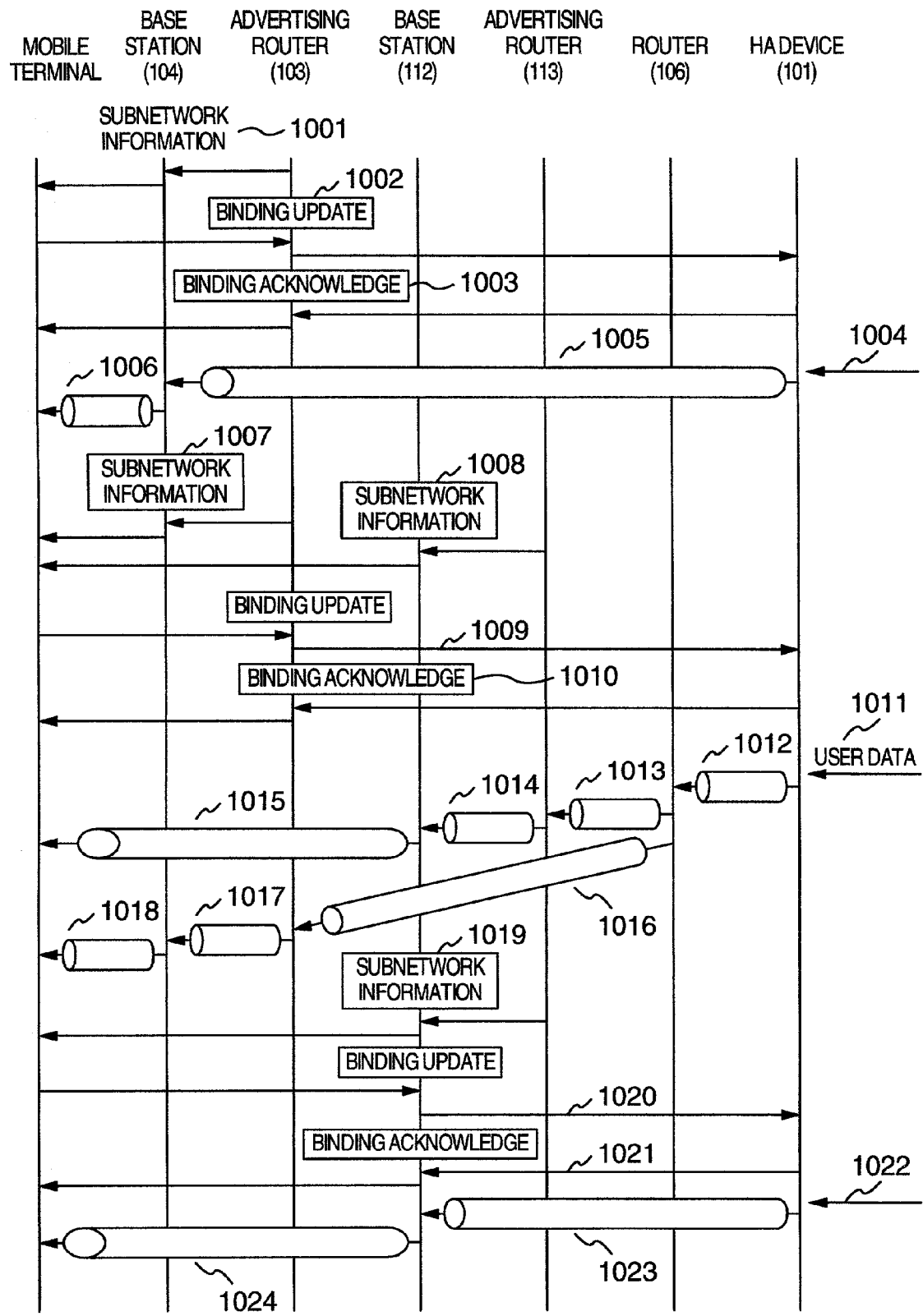
FIG. 8 is a sequence diagram in the case where handoff of a mobile terminal is conducted.

By referring to FIG. 8, operation conducted when the mobile terminal 105 performs handoff from the cell 109 in the subnetwork 102 to the cell 118 in the cell 118 in the subnetwork 114 will now be described.

In the cell 109 served by the base station 104, the mobile terminal 105 first receives subnetwork information from the advertising router 103 (1001), and conducts location registration (1002) by generating a care-of address and transmitting a Binding Update to the HA device 101 via the base station 103.

Upon receiving the Binding Update, the HA device 101 returns a Binding Acknowledgement for confirmation to the mobile terminal 105 (1003). Thereafter, the HA device 101 captures packets addressed to the home address of the mobile terminal 105 (1004). The HA device 101 encapsulates the packets, transfers the encapsulated packets to the care-of address, and delivers the encapsulated packets to the mobile terminal 105 (1005) (1006).

If the mobile terminal 105 moves to the vicinity of a boundary between the cell 109 and the cell 118 and becomes capable of receiving radio waves of both the base station 104 and the base station 112, then the mobile terminal 105 receives both subnetwork information of the subnetwork 102 sent from the advertising router 103 and subnetwork information of the subnetwork 114 sent from the advertising router 113 (1007) (1008).

The mobile terminal 105 checks a routing address besides a prefix address used to generate a care-of address. Besides the care-of address, the mobile terminal 105 generates a routing header address by conducting a logical sum operation on routing addresses received from both base stations, bit after bit, and registers them in the HA device 101 (1009).

Upon receiving the Binding Update, the HA device 101 returns a Binding Acknowledgement for confirmation to the mobile terminal 105 (1003), and stores the routing address besides the care-of address (1010).

Thereafter, the HA device 101 captures a packet addressed to the mobile terminal 105 (1011), and encapsulates the packet. In order that the encapsulated packet may be sent first to its routing address and then to its care-of address, the HA device sets the routing header address generated by the mobile terminal 105 in the destination address, sets the care-of address in the routing header, and transfers a resultant packet (1012).

When a packet having a prefix of a routing address set in the destination address is transferred to the router 106 in the mobile communication network, the router 106 copies the packet so as to send the packet to addresses each having 1 in one bit of the interface ID and transmits resultant packets (1013) (1016).

Upon receiving the copied packet, the advertising routers 103 and 113 transmitting the routing address conduct processing of the routing header, set the care-of address in the destination address, and send the packet to the base stations 104 and 112, respectively (1014) (1017).

The base stations 104 and 112 send the packet to the mobile terminal 105 (1015) (1018).

Therefore, it becomes possible for the mobile terminal 105 to previously conduct setting so as to transfer a packet also to the cell 118 considered to be handoff destination, before starting the handoff to the cell 118. Furthermore, since the mobile terminal 105 is made capable of receiving packets destined to both care-of addresses before and after movement, handoff with reduced packet losses can also be implemented.

The mobile terminal 105 further moves and becomes unable to receive no more than a radio wave emitted from the base station 112 (1019).

Then the mobile terminal 105 generates a care-of address on the basis of only subnetwork information of the subnetwork 114 received from the advertising router 113 via the base station 112, and conducts location registration with the HA device by using a Binding Update (1020).

The HA device 101 returns location registration confirmation (1021) to the mobile terminal 105 by using a Binding Acknowledgement.

Thereafter, the HA device 101 captures a packet addressed to the mobile terminal 105 (1022), encapsulates the packet, transfers the encapsulated packet toward the care-of address, and delivers it to the mobile terminal 105 (1023) (1024).

As another embodiment, an example in which a part of a prefix address contained in subnetwork information that is transmitted by the advertising router 103 of FIG. 1 via the base station 104 is used as a subnetwork indication section will now be described. According to this embodiment, it is not necessary to newly provide a field for the subnetwork indication section as in the first embodiment.

Figure 9:
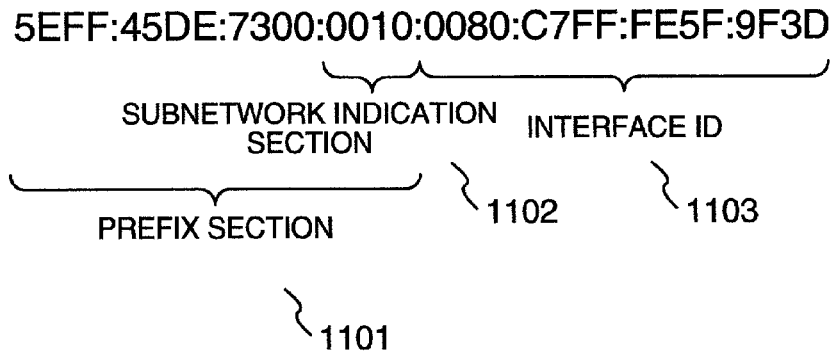
FIG. 9 is a diagram showing a configuration example of prefix information in another embodiment of the present invention.

FIG. 9 shows a configuration example of prefix information flown by the advertising router.

Sixty-four low-order bits form an Interface ID (1103) of the advertising router. Sixty-four high-order bits form a prefix section (1101). For example, 16 low-order bits of the prefix section form the subnetwork indication section (1102).

Upon receiving subnetwork information contained in a Router Advertisement message, which is transmitted from the advertising router, it becomes possible for the mobile terminal to know the prefix of the subnetwork to which the mobile terminal belongs, on the basis of the prefix address and the prefix length 211.

Figure 10:
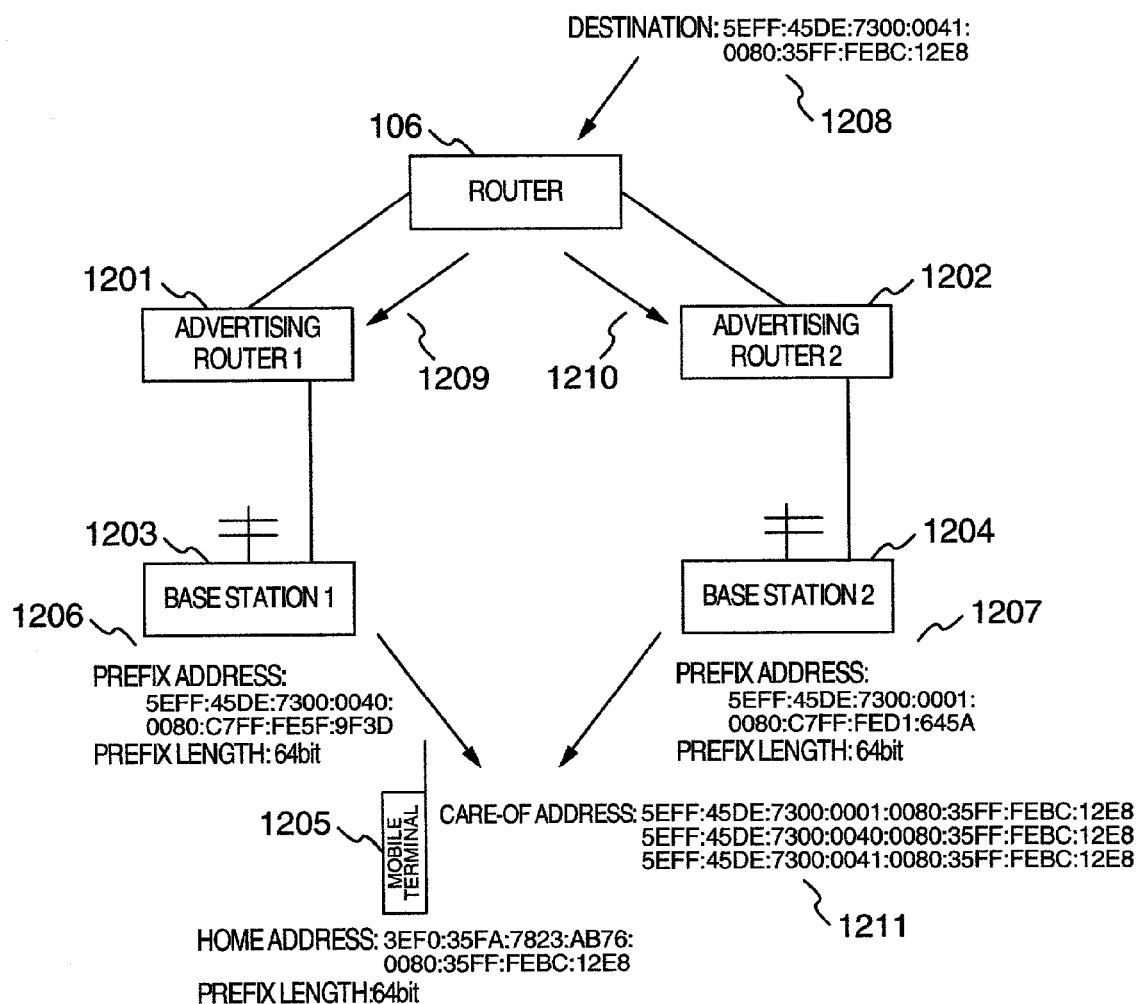
FIG. 10 is a diagram showing operation of another embodiment of the present invention.

By referring to FIG. 10, there will now be described a generation method of the care-of address in the case where a mobile terminal 1205 has received subnetwork information contained in a Router Advertisement message, which is transmitted by an advertising router, from a plurality of base stations.

In the present embodiment, 16 low-order bits of the prefix section 1101 form the subnetwork indication section 1102. It is assumed that the mobile terminal 1205 previously knows its location or can know the location from the information supplied from the advertising router.

The mobile terminal 1205 holds 3EF0:35FA:7823:AB76: 0080:35EF:FEBC:12E8 as the home address in the home network. It is supposed that 64 low-order bits of the home address are assigned as the interface ID uniquely to each mobile terminal, and used when generating a care-of address in a subnetwork to which the mobile terminal has moved.

In a place to which the mobile terminal 1205 has moved, it receives a first Router Advertisement message 1206 transmitted by the advertising router 103 via the base station 104. From fields of a prefix address of prefix information and a prefix length included therein, the mobile terminal 1205 generates 5EFF:45DE:7300:0040:0000:0000:0000:0000 as a prefix of a first care-of address.

In the same way, the mobile terminal 1205 receives a second Router Advertisement message 1207 transmitted by the advertising router 113 via the base station 112. From fields of a prefix address of prefix information and a prefix length included therein, the mobile terminal 1205 generates 5EFF:45DE:7300:0001:0000:0000:0000:0000 as a prefix of a second care-of address.

The mobile terminal 1205 compares the prefixes. Since they coincide in prefix 5EFF:45DE:7300 with the subnetwork indication section excluded, the mobile terminal 1205 conducts a logical sum operation on both prefixes, and adopts a synthesized prefix 5EFF:45DE:7300:0041:0000:0000:0000:0000 as a prefix that indicates two subnetworks.

By utilizing the address auto configuration function of IPv6, the mobile terminal 1205 further generates 5EFF:45DE:7300:0041:0080:35EF:FEBC:12E8 as a care-of address on the basis of the synthesized prefix and the interface ID uniquely assigned to the mobile terminal 1205. The mobile terminal 1205 registers it in the HA device 101.

Operation of the present embodiment will now be described by referring to FIG. 10.

The router 106, which transfers packets in the mobile communication network, creates a routing table on the basis of routing information received from another router by the router 106 and routing information of its own router. The router 106 exchanges routing information with other routers.

The router 106 has a processing section. If the routing information that the router 106 itself has or the routing information received from another router coincides with the prefix address of the subnetwork information advertised by the advertising router with the subnetwork indication section excluded, the processing section conducts a logical sum operation on prefix addresses of a plurality of coinciding subnetwork information pieces, and adds a result of the logical sum operation to the routing table.

The routing table of each router 106 in the mobile communication network is set so as to transfer a packet having "1" set in a plurality of bits of a subnetwork indication section of a destination address as far as an advertising router that is advertising an IP address having "1" set in any one bit of the subnetwork indication section as a prefix section 1101.

When an IP packet 1208 addressed to the mobile terminal 1205 having "1" set in a plurality of bits of a subnetwork indication section 1102 of a destination address has arrived, the router 106 generates a plurality of packets each having a prefix set to "1" in one bit of a subnetwork indication section 1102, and transmits the packets toward the pertinent subnetworks (1209) (1210).

If at that time the next hop is destined to the same router with respect to a plurality of packets, one copied packet is transmitted. In this state, the mobile terminal 105 is set so as to be able to receive not only a packet having "1" set in a plurality of bits of the subnetwork indication section 1102 as its care-of address but also a packet having "1" set in only one bit (1211).

Thus, if the mobile terminal 1205 becomes capable of receiving radio waves from a plurality of base stations 104 and 112 in the vicinity of a boundary between the subnetworks 102 and 114, then it becomes possible to previously conduct routing of packets as far as a base station in another subnetwork considered to become movement destination, before occurrence of handoff. Therefore, it becomes possible to receive packets addressed to the mobile terminal 1205 immediately after occurrence of handoff. It thus becomes possible to carry out handoff with reduced packet losses.

Figure 11:
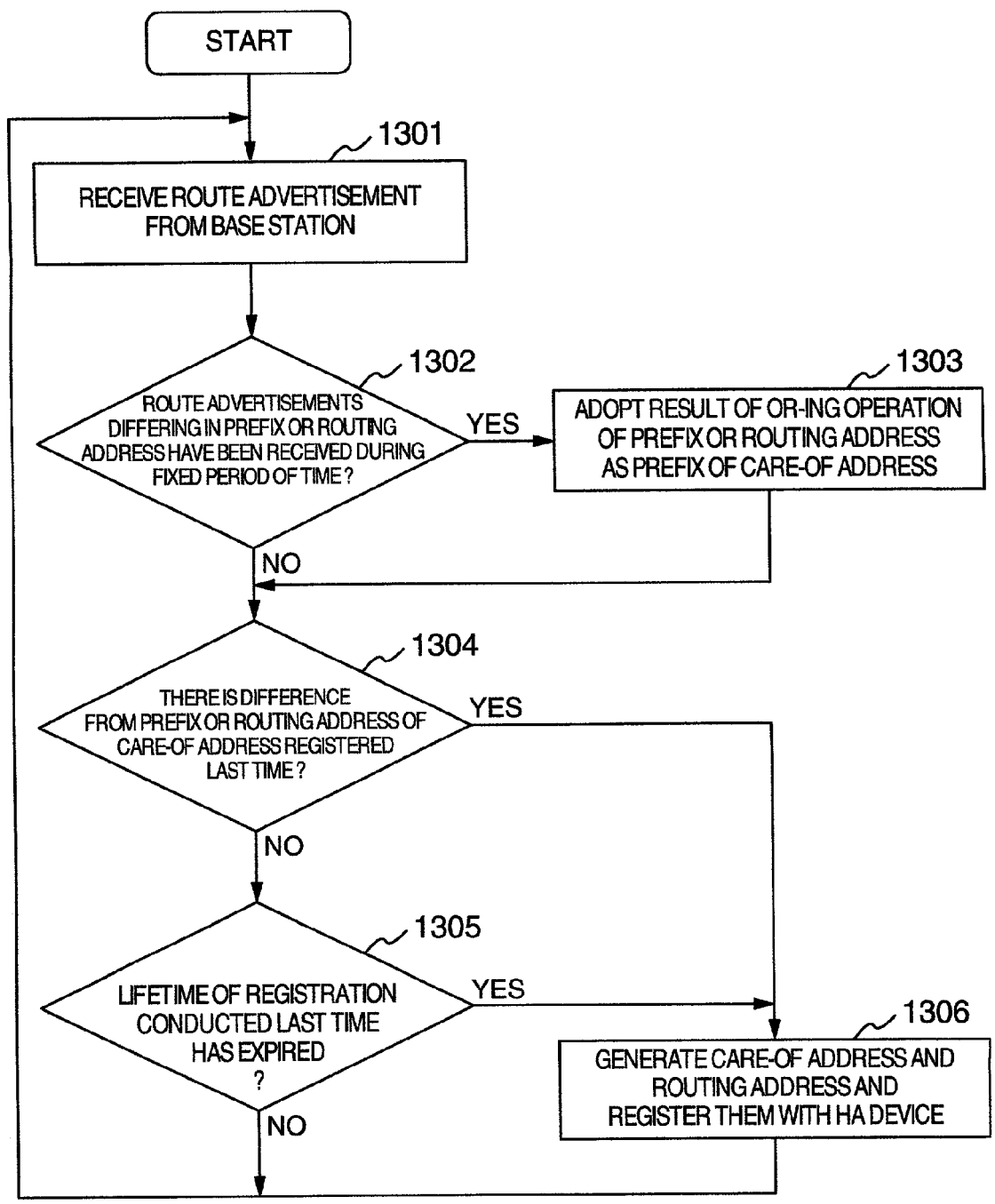
FIG. 11 is a flow chart in the case where a mobile terminal conducts location registration.

FIG. 11 shows operation conducted when a mobile terminal has received subnetwork information from a base station.

Upon receiving subnetwork information from an advertising router via the base station, the mobile terminal stores the subnetwork information (1301), and compares prefix addresses obtained from a plurality of subnetwork information pieces received during a certain time period to determine whether the prefix addresses are the same (1302). If the subnetwork indication sections are different, then the mobile terminal conducts a logical sum operation, and generates a care-of address by using a result of the logical sum operation as a prefix address (1303).

The mobile terminal determines whether the generated care-of address is different from the care-of address registered last time (1304). The mobile terminal determines whether the lifetime from the last registration has expired (1305). If at least one of them holds true, the mobile terminal transmits a Binding Update to the HA device and conducts location registration (1306).

Figure 12:
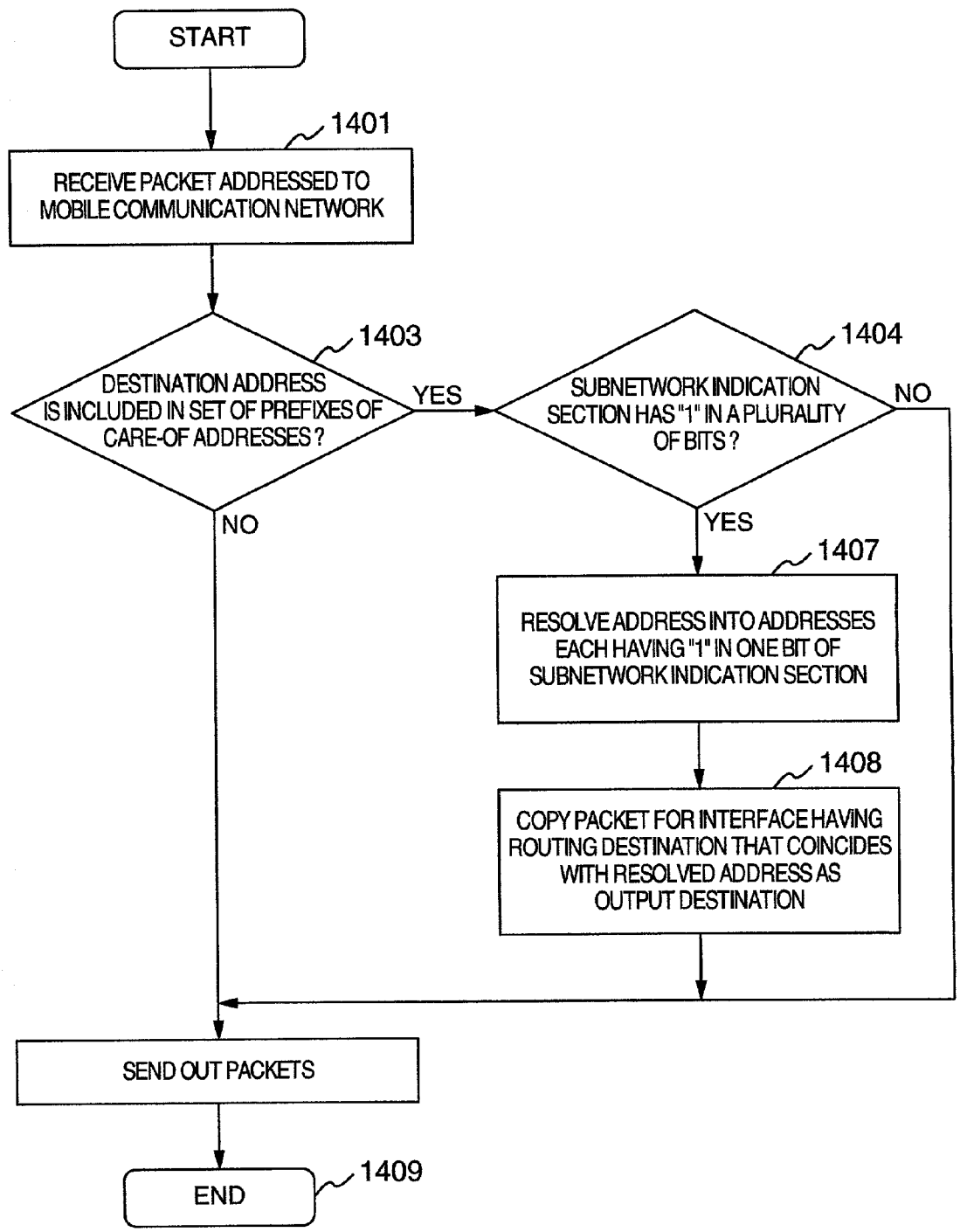
FIG. 12 is a flow chart in the case where a router conducts packet transfer.

FIG. 12 shows operation conducted when the router 106 has received a packet addressed to a care-of address or a packet having a routing address.

The router receives a packet for transfer in the mobile communication network (1401).

The router checks the destination IP address included in the packet. If it coincides with a prefix section used in the care-of address (1403), the router determines whether a plurality of bits are set in the subnetwork indication section (1404). If only one bit is set, the router conducts ordinary transfer processing (1409).

If a plurality of bits are set, then the router resolves the address of the subnetwork indication section into addresses each having "1" set in one bit (1407). The router copies the packet for each of interfaces having a coinciding prefix in the routing table (1408), and sends out resultant packets (1409).

The specification and drawings are to be regarded in an illustrative rather than a restrictive sense. It will, however, be evident that various modifications and changes may be made thereto without departing from the broader spirit and scope of the invention as set forth in the claims.

According to the present invention, it becomes possible to previously conduct routing of packets as far as a base station of handoff destination, before handoff is carried out. Therefore, it becomes possible to reduce packet losses at the time of handoff.

The specification and drawings are, accordingly, to be regarded in an illustrative rather than a restrictive sense. It will, however, be evident that various modifications and changes may be made thereto without departing from the broader spirit and scope of the invention as set forth in the claims.

The invention claimed is:

1. A mobile communication system comprising:
   a mobile terminal having means for receiving radio waves from a plurality of base stations;
   a home network to which the mobile terminal belongs;
   a plurality of subnetworks to which the terminal might move;
   advertising routers respectively provided in the subnetworks to advertise information of a pertinent subnetwork to the mobile terminal; and
   a home agent device having means for managing location information of the mobile terminal and registering a routing address to be used temporarily in a subnetwork to which the mobile terminal moves, and means responsive to a movement of the mobile terminal when the routing address is already registered, for capturing a packet addressed to a home address of the mobile terminal in the home network and transferring the captured packet to the subnetwork to which the mobile terminal moves in accordance with the registered routing address,
   wherein each of said advertising routers comprises means for advertising an interface ID and a prefix section of the routing address from a base station as pertinent subnetwork information, and wherein said mobile terminal comprises a registration unit, and if the terminal has received a plurality of routing addresses having same prefix section and differing in interface ID from the plurality of base stations while moving from the home network to a different subnetwork, then the registration unit combines the plurality of routing addresses into one recognizable routing header address in accordance with a predetermined rule, and registers the routing header address with the home agent device.

2. The mobile communication system according to claim 1, wherein
one different bit is assigned to the interface ID every subnetwork,
each of the advertising routers comprises means for transmitting subnetwork information which includes a routing address having "1" set in a bit assigned every subnetwork, and
the mobile terminal comprises means responsive to coincidence among prefix sections of routing addresses contained in a plurality of received subnetwork information pieces, for conducting a logical sum operation on interface IDs of routing addresses contained in the plurality of received subnetwork information pieces and adopting a result of the logical sum operation as the routing header address.

3. The mobile communication system according to claim 2, wherein the home agent device comprises:
means for storing a combination of a care-of address sent from the mobile terminal, the routing header address, and the home address of the terminal;
means for setting the care-of address as a routing header address of a packet addressed to the home address of the terminal;
means for encapsulating the packet having the care-of address set therein, and setting the routing header address as a destination address; and
means for sending out the encapsulated packet.

4. The mobile communication system according to claim 1, wherein a router in a mobile communication network comprises:
means for generating a packet having a destination address set to "1" in one bit of an interface ID, from a packet having the routing header address set as a destination address delivered from the home agent device and having "1" set in a plurality of bits of the interface ID, and transmitting the generated packet; or
a routing table set so as to transfer a packet having a prefix identical to that of a routing address of subnetwork information advertised by the advertising router, as a destination address as far as the advertising router that is advertising an address having "1" set in one bit of an interface ID.

5. The mobile communication system according to claim 1, wherein
a part of the prefix section of the subnetwork information advertised by the advertising router is assigned one bit that differs from subnetwork to subnetwork, as a subnetwork indication bit,
each of the base stations in the subnetworks comprises means for transmitting subnetwork information having "1" set in the assigned bit,
the mobile terminal comprises a registration unit, and if the prefix sections of a plurality of received subnetwork information pieces with the subnetwork indication bit excluded coincide, the registration unit conducts a logical sum operation on the prefix sections of the plurality of received subnetwork information pieces, generates a care-of address having a result of the logical sum operation as a prefix section, and registers the care-of address with the home agent device, and
a router in the mobile communication network comprises a routing table, and in case where a destination address of a packet to be transferred has "1" set in a plurality of the subnetwork indication bits, the routing table is set so as to transfer the packet as far as an advertising router that is advertising an address having "1" set in any one bit of the subnetwork indication section as a prefix section of subnetwork information.

6. The mobile communication system according to claim 1, wherein
the mobile communication system comprises a plurality of routers for transferring the packet in a mobile communication network,
the advertising router in each subnetwork comprises means for advertising subnetwork information, and the subnetwork information includes main subnetwork information for transferring a packet in the subnetwork and assistant subnetwork information,
the mobile terminal comprises: means responsive to reception of the subnetwork information from one base station, for generating a care-of address based on the main subnetwork information; means responsive to reception of the subnetwork information from a plurality of base stations and prefix sections of a plurality of received assistant subnetwork information pieces being identical, for generating a care-of address based on the prefix sections; and means for transmitting the generated care-of address to the home agent device, and
each of the routers for transferring the packet comprises a routing table set so as to conduct multicast routing of a packet having a prefix section of the assistant subnetwork information as far as each base station transmitting the assistant subnetwork information.

7. The mobile communication system according to claim 4, wherein the mobile terminal comprises means for receiving and processing a packet addressed to a plurality of care-of addresses.

8. The mobile communication system according to claim 5, wherein
the mobile communication system comprises a plurality of routers for transferring the packet in a mobile communication network, and
at least one of the routers comprises:
means for creating a routing table based on routing information received from other routers and routing information of the own router and exchanging routing information with other routers; and
means responsive to coincidence between routing information the own router has or received from other routers and prefix sections of a plurality of subnetwork information pieces advertised by the advertising router with subnetwork indication sections excluded, for calculating a logical sum on the coinciding prefix sections of the plurality of subnetwork information pieces and adding a result of the logical sum calculation to the routing table.

* * * * *